United States Patent [19]

Frisch

[11] Patent Number: 6,017,373

[45] Date of Patent: Jan. 25, 2000

[54] CRACKLING ARTIFICIAL LOG

[75] Inventor: Gary Frisch, Stockton, Calif.

[73] Assignee: Duraflame, Inc., Stockton, Calif.

[21] Appl. No.: 09/368,761

[22] Filed: Aug. 5, 1999

[51] Int. Cl.[7] .................................. C10L 5/36; C10L 5/44
[52] U.S. Cl. ................................ 44/535; 44/544; 44/572; 44/576; 44/580
[58] Field of Search ........................... 44/535, 572, 576, 44/544, 580

[56] References Cited

U.S. PATENT DOCUMENTS

| | | | |
|---|---|---|---|
| 3,843,336 | 10/1974 | Messman | 44/535 |
| 4,043,765 | 8/1977 | Tanner | 44/535 |
| 4,810,256 | 3/1989 | Fay, III et al. | 44/541 |
| 4,834,774 | 5/1989 | Fay, III et al. | 44/532 |
| 5,118,539 | 6/1992 | Sebby et al. | 44/535 |
| 5,868,804 | 2/1999 | Williams et al. | 44/535 |

*Primary Examiner*—Jacqueline V. Howard
*Attorney, Agent, or Firm*—Loeb & Loeb LLP

[57] ABSTRACT

An artificial firelog which contain 2% to about 6%$_w$ coriander seed added to create a crackling sound that mimics the sounds produced during the burning of natural logs. The random crackling sound continues for approximately the same time period as observed with the burning of natural wood firelogs and has an amplitude and frequency of crackling sound that mimics burning natural wood logs.

7 Claims, 2 Drawing Sheets

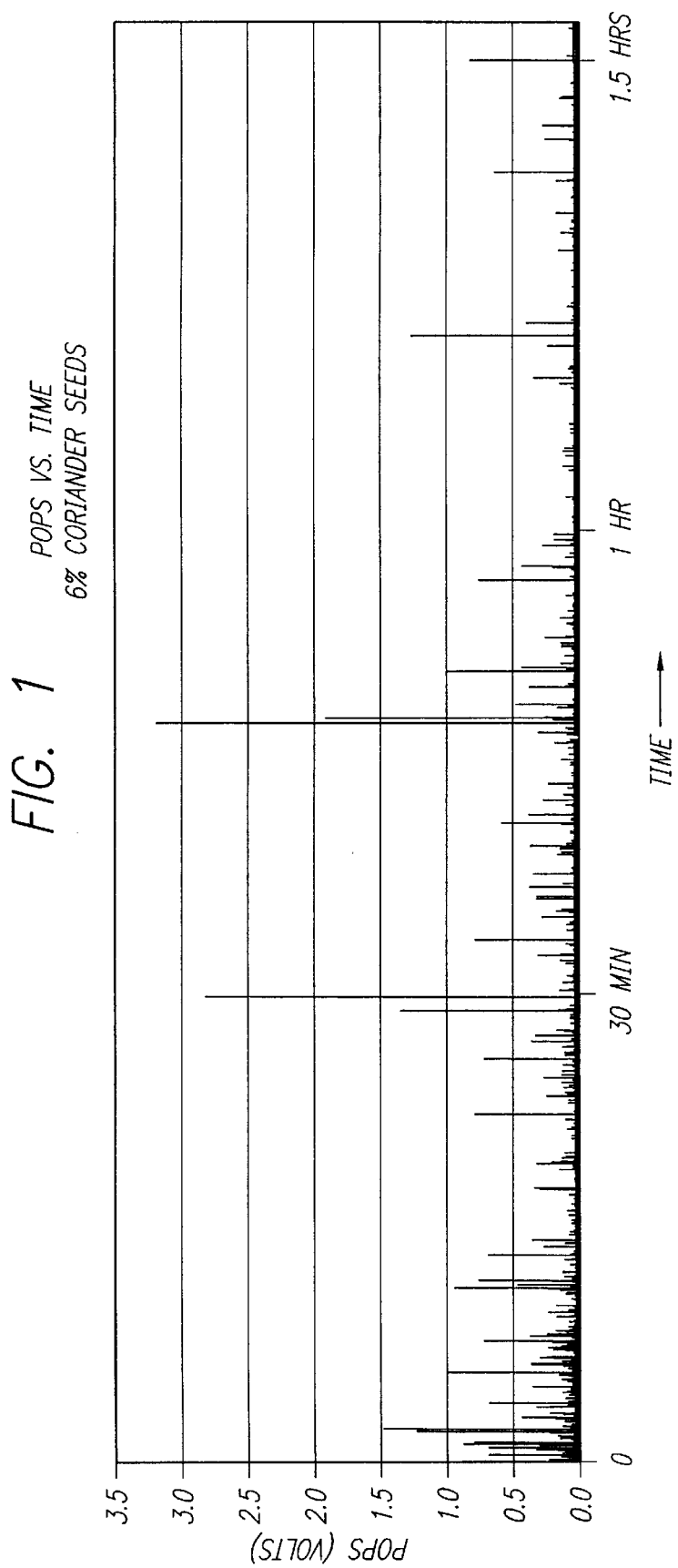

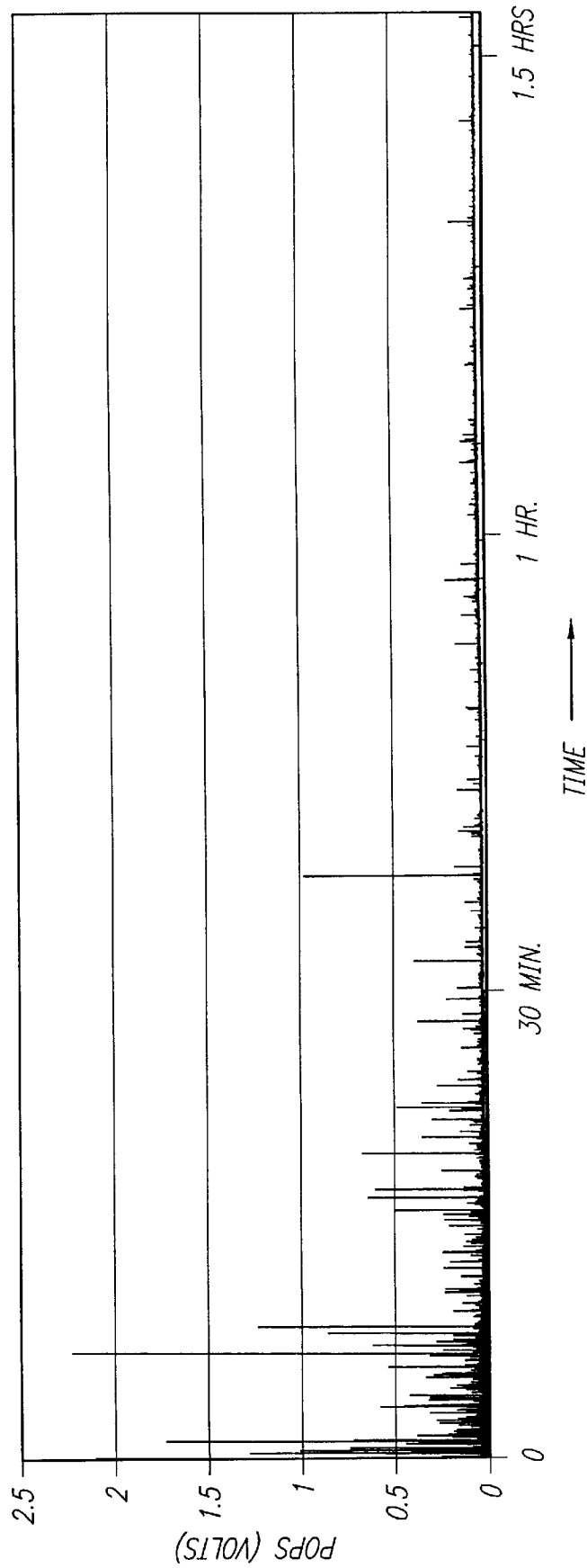

CRACKLING ARTIFICIAL LOG

BACKGROUND OF THE INVENTION

1. Area of the Art

The invention relates to artificial firelogs which contain additives added to create a crackling sound that mimics the sounds produced during the burning of natural wood logs. The random crackling sound is most prominent in the early portion of the burn and weakens in intensity during the burn cycle similar to the performance of burning natural wood logs.

2. Description of the Prior Art

Synthetic fireplace logs are manufactured from a broad range of flammable cellulosic components in combination with a binder, and possibly other additives. Typical flammable cellulosic components include wood particles, pulp, shavings or chips, sawdust, ground bark, shredded paper or cardboard, waxed cardboard, charcoal powder, spagnum moss, and agricultural waste materials such as straw, bagasse, grass clippings, leaves, cotton linter, rice hulls, peanut or other nut shells and coffee grounds. The binder is typically a flammable wax such as paraffin wax or slack wax or flammable vegetable oils such as stearic and/or paimitic acid or other fatty acids or esters. However, numerous other combustible components are used or could be used. This list of materials is not intended to limit the composition of flammable artificial logs. Other additives may include chemicals designed to color or otherwise modify or retard the flame, add aroma or change the burning characteristics to more closely mimic the burning of natural logs.

A single artificial log, which weighs 5–6 pounds, is designed to burn unattended for about 3–4 hours. For comparison, a 5–6 pound oak log will burn for about ⅓ of that time. To get a comparable burning time, 3 logs of 5–6 pounds are generally burned at one time. Also, to sustain a 3–4 hour burn with the desired ambiance and flame intensity, it is often necessary to stir the natural log fire and turn over the logs to get a relatively uniform and intense burn.

Typical prior art artificial logs burn much more quietly than natural logs and do not duplicate the roar of burning natural logs. Also, as discussed below, natural logs exhibit loud snapping and popping, the snapping and popping arising from heating of moisture and sap which naturally exist in the log.

U.S. Pat. No. 5,868,804 issued Feb. 9, 1999 to Williams, et al. is directed to an artificial log having an additive consisting of 1) mustard, flax, cumin, or sesame seed, or a combination thereof, 2) hollow synthetic spheres, or 3) a combination of the seed component and the hollow synthetic spheres, to provide an audible crackling sound during burning of the logs. U.S. Pat. No. 5,118,539 to Sebby et al., shows artificial fire logs containing seeds found in bird food mix, particularly hemp, millet and sunflower seeds, to provide a popping sound. Williams claims that the sound produced by the seeds disclosed by Sebby et al are inadequate as well as short lived and do not adequately duplicate the sound of natural burning logs.

The '804 patent indicates that the preferred seed must have a shell with sufficient strength to withstand heat for a period of time and to then suddenly burst as a result of buildup of inner pressure from gases formed from the water and oils within the seed. Suitable seeds are seamless with a round or oval shape. According to Williams, the seeds used by Sebby tend to burn and prematurely rupture. Williams identifies only mustard, flax, cumin and sesame seed as meeting his criteria.

Alternatively, synthetic hollow spheres or granular material, such as glass, ceramic or plastic spheres have been used. Williams et al uses Z-light W-1300 or W1800 silica-alumina ceramic spheres manufactured by 3M. These spheres are alleged to have the ability to provide a crackling sound through the whole burning cycle, a characteristic not shown by the seeds. Williams finds that the seed generated sound does not last the full burning time of the artificial log.

Using a test log formulation, Williams reports that the W1800 ceramic spheres provided popping or "poof" sound for the whole burning cycle of 3.25 to 3.5 hrs. The sound from the mustard and sesame seeds lasted for 2 to 2.25 hrs.(approximately 60 to 65% of the burning cycle) while the flax and cumin seeds produced sound for only about 0.75–1.25 hr (approximately 20 to about 35% of the burning cycle). This is in comparison to the Sebby et al sunflower and millet seeds which Williams reported lasted 0.25–0.5 hr.

Natural burning logs generate a snapping, popping and crackling sound as the moisture and oils naturally occurring in the wood are heated, creating steam and vapor. This expanding steam and vapor causes the wood to crack creating the observed sounds. However, these sounds will not persist throughout the burning cycle. As the wood is heated by the surrounding flames, the vaporizable components are dissipated long before the natural log stops burning. As a result, the sounds start as the natural wood starts to burn, increases in a random, but persistent manner for a period of time followed by a tapering off of the frequency of the sound. The longevity, persistence and frequency of these sounds depends on the moisture and oil content of the natural wood and the density and hardness of the wood. However, in typical natural fire wood, the sounds persist for about one-half of the burning cycle.

The prior art compositions either have a very short lived popping sound or the sound persists for a significantly longer portion of the burning cycle, thus creating an unrealistic simulation of the burning of natural logs, or the sound is not of a quality or volume to simulate burning of natural logs. Therefore, there is a need for a synthetic log that more closely simulates the actual performance of burning natural logs.

SUMMARY OF THE INVENTION

Artificial logs embodying features of the invention comprise one or more flammable materials, preferably cellulosic materials, and a wax binder blended and shaped in the manner typical of the artificial logs available in the past. Coriander seed is added to this composition during fabrication of the artificial log. The coriander seed may be supplemented with naturally occurring geologic material of volcanic origin. A typical composition contains 4–6%$_w$ coriander seed. The seed produces a random popping sound, with a volume similar to burning natural wood logs, for about 50% of the burning cycle of the log. This may be supplemented by replacing up to about one third of the seed with an equal percentage of naturally occurring geological materials if a consistent popping sound is desired throughout the remainder of burning cycle of the artificial log. The objective of adding these materials is to generate sound typical of burning natural logs.

BRIEF DESCRIPTION OF THE DRAWINGS

FIG. 1 is a graphical representation of the sounds produced during the burning of an artificial log containing coriander seed.

FIG. 2 is a graphical representation of the sounds produced during the burning of an artificial log containing mustard seed.

DETAILED DESCRIPTION OF THE INVENTION

Common observation suggests that the most natural are sounds emanating from burning artificial logs which continue in a persistent but erratic manner for only about half of the burning cycle. Some residual snapping or crackling sound for some, but not all of the remaining burning cycle is also desired. Coriander seed added to an artificial log creates a crackling sound for about the first half of burning cycle. This is also accomplished without a popping or spitting of material out of the burning log, which occurs with some seed additives, which is both unnatural as well as hazardous. Based on an evaluation of about 30 different additives, primarily seeds and other organic materials, including the preferred mustard seed of the '804 patent, and the bird seed components suggested by the Sebby et al. patent, it was found that coriander seed containing logs have a sound and burning appearance more acceptable to customers than any of the prior proposed additives.

Various different materials were heated on an industrial finsealer to identify those materials which exhibited a crackling/popping effect. Suitable candidates were then added in about 2% to about $4\%_w$ quantities to handmade artificial logs for test burning. Those materials demonstrating the best desired performance were then further tested in various concentrations and combinations. Many materials produced a crackle sound. However, coriander seeds had the most preferred performance.

Artificial logs fabricated in accordance with the invention contain 4–6% of coriander seed. This seed was selected as superior to the other approximately 30 different seeds that were tested, including yellow mustard seed, because it provided the most acceptable crackling sound without popping or spitting of material from the fireplace, for about 1.5 hours to less than about 2 hours of the burning time, which is about 45 to 55% of the burning cycle. Further, the intensity of the popping sound of coriander seed, while not as loud as the popping of natural logs, is much greater than that of any of the other seeds tested.

It was also discovered that naturally occurring materials such as pumice, sand and volcanic mineral derivatives also provide a crackling sound. These materials have either vesicular structures (small spherical cavities in volcanic materials produced by bubbles of gas trapped in molten rock) due to their volcanic origins or have small interstices or chambers due to their biogenic origins. Each are commercially mined, low cost, and environmentally benign. All the materials have naturally formed pockets with gas trapped therein and will absorb and hold considerable water. The materials that were evaluated include pumice (68% $SiO_2$), volcanic cinder (38% $SiO_2$), diatomaceous earth or diatomite (95% $SiO_2$), perlite (75% $SiO_2$), and calcareous sand (calcium and magnesium carbonates). Exfoliated perlite granules that are saturated with water, when added to a firelog mixture in the range of 3% to 10% by weight, produce a noticeable crackling effect. The crackling effect begins almost immediately upon ignition of the test firelog and is audible throughout the test while flames were visible. The crackling effect is most intense during the beginning portion of the burn period. Because of the static nature of the crackling sounds created, this additive alone did not produce a natural sounding log. However, a mixture of between $2\%_w$ and $4\%_w$ of these geological materials with $2\%_w$–$4\%_w$ coriander seed, resulting in a product with from about $4\%_w$ to about $8\%_w$ of the combined additives, produces a highly acceptable snapping and crackling sound during the first half of a log burning cycle followed by a continuous but reduced frequency crackling sound throughout the remainder of the burning cycle.

To determine the preferred compositions or combinations of materials, candidate additives were heated and artificial logs containing various different seeds or other materials found to generate a snapping, crackling or popping sound noise upon heating were added to an artificial log composition and burned. Table 1 lists these materials and the observed sounds or appearance. Certain materials were eliminated because they created an unnatural sound, the sound lasted for only a limited period of time or the burning artificial log showed undesirable effects such as bursting, spitting or splattering of the flames.

TABLE 1

Crackling Additives Characteristics

| ADDITIVE | BEHAVIOR |
| --- | --- |
| 1. Coriander Seed | |
| Grade 1* | Good crackle, random, continuous. |
| Grade 2* | Good crackle but excessive stalks, half shells in sample. |
| Grade 3* | Too many stalks, half shells in sample. |
| 2. Rape Seed | Crackled but not very loud, third best evaluated, seed better than most, not as good as mustard or cariander. |
| 3. Amaranth Seed | Very little crackle or pop. |
| 4. Canola Seed | Crackled some. |
| 5. Mustard | |
| White | Continuous crackle of limited duration, not very loud. |
| Brown | Continuous crackle of limited duration, not very loud. |
| Black | Continuous crackle of limited duration, not very loud. |
| Yellow | Continuous crackle of limited duration, not very loud. |
| 6. Juniper branches | No crackle, good smell. |
| 7. Oats | Good crackles and pops. Forceful pops to the point of exiting fireplace, unsafe. |
| 8. Wheat | No crackling or popping observed. |
| 9. Quinoa | Some crackle, not loud enough, no duration. |
| 10. Bulgar | No crackling or popping observed. |
| 11. Beluga lentil | No crackling or popping observed. |
| 12. Green lentil | No crackling or popping observed. |
| 13. Corn kernals crushed corn | No crackling or popping observed. No crackling or popping observed. |
| 14. Safflower seeds | Some crackle, did not last long. |
| 15. Barley | No crackling or popping observed. |
| 16. Sudan seeds | No crackling or popping observed. |
| 17. Radish seeds | Very little crackle. |
| 18. Poppy seeds | Very little crackle. |
| 19. Parakeet feed | Some crackling, no duration, not loud enough. |
| 20. Mixed grass seed | No crackling or popping observed. |
| 21. Parrot seed | Little crackling, no duration, not loud enough. |
| 22. Carrot seed | No crackling or popping observed. |
| 23. Lettuce seed | No crackling or popping observed. |
| 24. Broccoli seed | No crackling or popping observed. |
| 25. Cowpea | No crackling or popping observed. |

*Grades have to do with cleanliness of seed, i.e., amount of half shells, fines, stalks.

Representative compositions using various additives are described below:

EXAMPLE 1 (Test Product)

A mixture of 35–40 pounds of ground wood chips and sawdust (approximately $30–60\%_w$ wood chips) was mixed in a vessel with 60–65 pounds of petrolatum and/or slack wax. However, the ratio of sawdust to wood chips can be significantly reduced without significantly affecting the performance of the end product. The wax was heated to its melting point. The moisture content of the wood chips and sawdust was between 8–12%. This mixture was cooled to a temperature of 20° F. over ambient room temperature at which time 4–6 pounds of the mixture was removed and replaced with a like quantity of grade #1 coriander seed. The seed was dispersed evenly throughout the mixture by mixing for several minutes. This mixture was then allowed to cool to 10° F. over ambient room temperature at which time it was fed into an agitated extruder hopper which feeds a firelog extruder. Approximately 20 five-pound firelogs were produced from 100 pounds of the mixture. The logs burned for about 3.5 hours in a test fireplace. They provided a realistic wood-like crackle sound beginning at ignition and lasting for about 1.5 hours (see FIG. 1).

EXAMPLE 2 (Test Product)

In a vessel, ground wood chips and sawdust were mixed with petrolatum and slack wax in substantially the same quantities as in Example 1. The wax was heated to its melting point. The moisture content of the wood chips and sawdust was between 8–12%. This mixture was cooled to a temperature of 20° F. over ambient room temperature at which time 4–6 pounds of the mixture was removed and replaced with a like quantity of yellow mustard seed. The seed was dispersed evenly throughout the mixture by mixing for several minutes. This mixture was then allowed to cool to 10° F. over ambient room temperature at which time it was fed into an agitated extruder hopper which feeds a firelog extruder. The 100-pound batch produced approximately 20 five-pound logs. The logs, burned for about 3.5 hours in a test fireplace. While the crackle sounds could be detected for approximately 2 hours, the majority of sounds were in the first 40 minutes. The intensity of the sound was significantly reduced for the remainder of the 2 hours (see FIG. 2). The crackling sounds were not as loud, or as random as the coriander test logs. Test individuals perceived the sound intensity and persistence of the coriander seed containing logs to be more natural than the softer popping and less persistent mustard seed containing logs.

In a commercial production process, a mixture of a ground cellulosic combustible material (such as wood chips, sawdust, cardboard, waxed cardboard, various agricultural bio mass, or a blend of these materials) and a flammable binder material (such as petrolatum, paraffin or slack waxes, molasses, fatty acids or stearic acids derived from vegetable or a blend of these materials) is prepared in a large industrial tank. The cellulosic combustible material is provided in a relatively dry condition (8–12% moisture content) in a percentage by weight of the total mixture ranging from 35–55%. The flammable binder material is heated to at least its melting point and added to the mixture so that it constitutes about 45–65%$_w$ of the total mixture. In a continuous mixing system grade #1 coriander seed is added to the blended mixture of the cellulosic combustible material and the flammable binder with a horizontal mixing screw. The coriander seed is added at a rate of 45–60 pounds per minute. The preferred seed mixture would contain between 4–6% coriander seed. This mixture is allowed to cool to about 10° F. over ambient temperature at which time it is fed into an agitated extruder hopper that feeds a firelog extruder. The mixture is extruded into various log like shapes of varying dimensions and weight. Depending on the size of the extruded product the logs will burn for between two to four hours. Logs weighing five pounds have been demonstrated to burn for up to 3.5 hours in a standard fireplace with a wood-like crackling sound. The crackling sound starts on ignition of the log and lasts for about 1.5 hours.

EXAMPLE 3

Exfoliated perlite granules, that are saturated with water, were added to a cooled mixture of ground sawdust or other cellulosic combustible materials and blended petroleum wax. The ratio of ground sawdust or other cellulosic materials to blended wax was approximately 40%$_w$ to 60%$_w$, respectively. The perlite granules were present in the mixture in a range of 3% to 10% by weight. The total weight of the mixture was about 1000 g. The mixture was then formed into 3" diameter log shape. When a test log was ignited and burned in a standard fireplace, the perlite granules produced a noticeable crackling effect immediately upon ignition of the log. This effect was audible throughout the test while flames were visible with the crackling sound most intense during the beginning portion of the burn period.

An electronic system was constructed to record the amplitude and frequency of the sounds created when various different artificial logs are burned. The system provided a digital and/or graphical representation of the sound of the various different logs during a burning test. FIGS. 1 and 2 show the graphical images of the sound occurrences produced from burning the products prepared according to Examples 1 and 2. A comparison under the same conditions with the burning of natural logs could not be made because the burning of artificial logs persists for up to 3–4 hours without human intervention. In contrast, a 3–4 hour burn of natural logs requires 3 times as much material and constant intervention of individuals to stir and turn the logs, as is normally the situation when natural logs are used. It should be noted that the time representation in the graphics is not uniform. Instead, the time indicated is the time when a sound event occurred.

A comparison of FIGS. 1 and 2 reveals that sounds produced from burning an artificial log containing coriander seed is louder, has a more audible crackle, and it is more random and more variable than mustard seed containing logs. Referring to FIGS. 1 and 2, the voltage reading is translatable to the intensity of the sound produced. On a comparative scale, the mustard seed log exhibited numerous sound events in the first approximately 8 minutes and a lesser number of events for an additional 37 minutes. Only in the first 8 minutes were pops recorded in the 1–2.3 volt range and, for the remainder of the first 37 minutes, the pops had an intensity less than 1 volt. Thereafter the sound events were of a very low intensity for the remainder of the burn. Only 1.5 hours are shown.

In contrast, the coriander seed containing log had a more active and more varied sound event history for about the first 40 minutes with a varied collection of sound events occurring for the entire approximately 1.5 hours (the initial portion) of the burn cycle. It is clear that the coriander seed exhibits noticeable crackling for at least 1.5 hours while the mustard seed has an initial spurt of noise events followed by lesser intensity events for only about 40 minutes with the remainder of the first 1.5 hours of the burning showing low intensity, widely dispersed sound events.

As a result the longevity and randomness of the coriander seed generated sound is perceived to be more natural and pleasing, and presents a more desirable ambiance to observers, particularly during the first 30 to 45 minutes. When the coriander seeds are used in 4–6% levels, the sounds continued for 1½–2 hours, creating the most acceptable burning product.

A comparison of coriander and mustard seed also shows that:

1) Coriander seeds contain twice the moisture of mustard seeds in terms of percentage of moisture by weight comparison.

2) the hardness of coriander seeds is different from mustard seeds, the mustard seed being much harder.

3) the coriander seeds are approximately twice the diameter of mustard seeds and more variable in diameter distribution resulting in a greater variety of loudness and quality of popping sounds.

4) mustard seeds are round and smooth without seams while coriander seeds tend to be more oval and have numerous circumferential ridges and valleys in the surface itself.

I claim:

1. An artificial firelog comprising combustible materials, a combustible binder and an effective amount of a sound generating additive to provide a crackling sound during at least a portion of the burning of the firelog wherein the crackling additive is coriander seed, said coriander seed providing a crackling sound for up to at least abut 1.5 hours of the burning time of the firelog.

2. The artificial firelog of claim 1 wherein the coriander seed is present from about $4\%_w$ to about $6\%_w$ of the firelog.

3. The artificial firelog of claim 1 further containing naturally occurring geologic materials.

4. The artificial firelog of claim 3 wherein the combination of the coriander seed and the geologic materials constitute in combination from about $4\%_w$ to about $8\%_w$ of the firelog and the geologic material constitute from about $2\%_w$ to about $4\%_w$ of the firelog.

5. The artificial firelog of claim 3 wherein the naturally occurring geologic materials are selected from the group consisting of pumice, volcanic cinder, diatomaceous earth, diatomite, perlite and calcareous sand.

6. An artificial firelog formed from a mixture of cellulosic material and a wax binder comprising from about $35\%_w$ to about $55\%_w$ of a cellulosic material and from about $45\%_w$ to $65\%_w$ of a flammable wax binder, the artificial log further comprising from about $4\%_w$ to about $6\%_w$ of coriander seed, said artificial log once ignited burning for up to about 3.5 hours with a natural sounding crackling sound for up to at least about 1.5 hours of the time of burning.

7. An artificial firelog formed from a mixture of cellulosic material and a wax binder comprising from about $35\%_w$ to about $55\%_w$ of a cellulosic material and from about $45\%_w$ to $65\%_w$ of a flammable wax binder, the artificial log further comprising from about $2\%_w$ to about $4\%_w$ of coriander seed and from about $2\%_w$ to about $4\%_w$ of a geological material, the combination of the coriander seed and the geological material constituting from about $4\%_w$ to about $8\%_w$ of the artificial log, said artificial log once ignited burning for up to about 3.5 hours with a crackling sound for up to at least about 3.0 hours of the time of burning.

* * * * *